(12) United States Patent
Ogiwara

(10) Patent No.: US 11,586,720 B2
(45) Date of Patent: Feb. 21, 2023

(54) DISPLAY SYSTEM, RECEPTION DEVICE, DISPLAY DEVICE AND COMMUNICATION CONNECTION METHOD

(71) Applicant: NEC Display Solutions, Ltd., Tokyo (JP)

(72) Inventor: Yusuke Ogiwara, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 756 days.

(21) Appl. No.: 16/322,445

(22) PCT Filed: Aug. 5, 2016

(86) PCT No.: PCT/JP2016/073105
§ 371 (c)(1),
(2) Date: Jan. 31, 2019

(87) PCT Pub. No.: WO2018/025401
PCT Pub. Date: Feb. 8, 2018

(65) Prior Publication Data
US 2021/0334354 A1      Oct. 28, 2021

(51) Int. Cl.
*G06F 21/45*      (2013.01)

(52) U.S. Cl.
CPC .................... *G06F 21/45* (2013.01)

(58) Field of Classification Search
CPC ....... G06F 21/45; H04W 92/18; H04W 84/12; H04W 76/10; H04W 12/06; H04W 12/08
See application file for complete search history.

(56) References Cited

U.S. PATENT DOCUMENTS

| | | | |
|---|---|---|---|
| 2001/0009417 A1* | 7/2001 | Asai | G09G 3/3629 345/204 |
| 2004/0236939 A1* | 11/2004 | Watanabe | H04W 12/033 713/150 |

(Continued)

FOREIGN PATENT DOCUMENTS

| | | |
|---|---|---|
| JP | 2004-007081 A | 1/2004 |
| JP | 2005-117488 A | 4/2005 |

(Continued)

OTHER PUBLICATIONS

International Search Report (ISR) (PCT Form PCT/ISA/210), in PCT/JP2016/073105, dated Sep. 6, 2016.

(Continued)

*Primary Examiner* — Tongoc Tran
(74) *Attorney, Agent, or Firm* — McGinn I.P. Law Group, PLLC.

(57) ABSTRACT

A display system includes: a transmission device that transmits image data; a reception device that is connected to the transmission device and receives the image data; and a display device that displays an image indicated by the image data received by the reception device. The reception device creates a connection code, creates a security key, which is used for connection with the transmission device, from the connection code, and transmits the connection code to the display device to cause the display device to display it. The display device displays the connection code. The transmission device creates the security key from the connection code having been inputted, and is connected to the reception device by using the security key.

14 Claims, 6 Drawing Sheets

(56) References Cited

U.S. PATENT DOCUMENTS

| | | | | |
|---|---|---|---|---|
| 2004/0264395 | A1* | 12/2004 | Rao | H04W 48/20 |
| | | | | 370/312 |
| 2005/0226423 | A1* | 10/2005 | Li | H04L 63/08 |
| | | | | 380/278 |
| 2006/0023651 | A1* | 2/2006 | Tsuchiuchi | H04W 12/06 |
| | | | | 370/310 |
| 2007/0156857 | A1* | 7/2007 | King | H04L 41/0806 |
| | | | | 709/220 |
| 2007/0157024 | A1* | 7/2007 | Miller | H04L 67/14 |
| | | | | 713/168 |
| 2008/0037534 | A1* | 2/2008 | Shina | H04M 3/4938 |
| | | | | 370/389 |
| 2013/0095165 | A1* | 4/2013 | Olson | A61K 47/36 |
| | | | | 424/443 |
| 2017/0280327 | A1* | 9/2017 | Masuoka | H04W 12/06 |
| 2021/0250760 | A1* | 8/2021 | Yoshida | H04W 12/03 |

FOREIGN PATENT DOCUMENTS

| | | |
|---|---|---|
| JP | 2006-042087 A | 2/2006 |
| JP | 2007-312179 A | 11/2007 |
| JP | 2009-513089 A | 3/2009 |
| JP | 2015-002412 A | 1/2015 |
| JP | 2015-177285 A | 10/2015 |
| WO | WO 2016/031062 A1 | 3/2016 |

OTHER PUBLICATIONS

Japanese Decision to Grant a Patent dated Mar. 10, 2020 for Japanese Patent Application No. 2018-531711, and English Translation thereof.

\* cited by examiner

DISPLAY SYSTEM, RECEPTION DEVICE, DISPLAY DEVICE AND COMMUNICATION CONNECTION METHOD

TECHNICAL FIELD

The present invention relates to a display system including a transmission device, a reception device and a display device, and a communication connection method thereof.

BACKGROUND ART

In recent years, there have been developed technologies that connect terminal devices, such as personal computers, tablet terminals or smartphones, and display devices, such as projectors or large-sized displays, via a wireless LAN (local area network) or the like, to make it possible to display images transmitted from the terminal devices on the display devices.

Moreover, recently, use modes that connect plural terminal devices to a single display device at the same time, to thereby cause the display device to display images indicated by image data transmitted from one or more terminal devices have increased. Such use modes can be realized, when, for example, the display device includes a function such as a wireless LAN access point. In that case, the terminal device owned by each user can directly transmit the image data to the display device, without a router or the like. Note that the technology enabling connection to the wireless LAN access point and utilization of communication service via the wireless LAN access point is described, for example, in Patent Document 1.

However, connection settings for the wireless LAN access point are still highly difficult operations for many users. Therefore, for example, a technique for automatically connecting to the wireless LAN access point from a terminal device by inputting a predetermined PIN (personal/product identification number) code or the like has been considered.

By the way, normally, a wireless LAN access point stores information of terminal devices that are currently connected in a storage table. The number of terminal devices that can be stored in the storage table is finite, and therefore, the number of terminal devices that can be connected to the wireless LAN access point at the same time is limited to a range from about 10 to about 50 at most. Moreover, the wireless LAN access point has characteristics of maintaining connection, once the terminal device is connected, until radio waves from the wireless LAN access point cannot be received by the terminal device unless a user who owns the terminal device performs a disconnection operation.

The number of terminal devices simultaneously connectable to the wireless LAN access point is sufficient for personal or home use; however, when there are many users, such as in a company or a school, the number reaches an upper limit immediately.

For example, consider the case in which the connection upper limit number of a projector with a function of wireless LAN access point placed in a meeting room is 15, and in which radio waves from the projector reach a relatively wide range in an office including the meeting room. In this case, when 10 company members having respective terminal devices conduct a meeting by using the projector in the meeting room, and thereafter, the other 10 company members conduct a meeting by using the projector in the meeting room, there is a possibility that terminal devices owned by 5 company members cannot connect to the projector.

In other words, when a connecting state with a previously-connected terminal device is maintained, due to the connection upper limit number of the wireless LAN access point, a problem occurs in which the number of connectable terminal devices to be connected from then on is reduced.

RELATED ART DOCUMENTS

Patent Documents

Patent Document 1: JP2005-117488A

SUMMARY

An object of the present invention is to provide a display system, a reception device, a display device and a communication connection method capable of solving the above-described problem.

To achieve the above-described object, an exemplary aspect of a display system according to the present invention includes: a transmission device that transmits image data; a reception device that is connected to the transmission device and receives the image data; and a display device that displays an image indicated by the image data received by the reception device, wherein the reception device creates a connection code, and creates a security key from the connection code, the security key being used to connect with the transmission device, the display device displays the connection code, and the transmission device creates the security key from the connection code having been inputted, and is connected to the reception device by using the security key.

An exemplary aspect of a reception device according to the present invention includes: a communication unit that is connected to a transmission device transmitting image data and that receives the image data; a connection code creator that creates a connection code; a security key creator that creates a security key from the connection code, the security key being used to connect with the transmission device; and a display output unit that outputs the connection code.

An exemplary aspect of a display device according to the present invention includes: the above-described reception device; a display input unit that receives a connection code outputted from the reception device; and a display unit that displays the connection code received by the display input unit.

Otherwise, an exemplary aspect of a display device according to the present invention includes: a connection code creator that creates a connection code; a display unit that displays the connection code; and a controller that is connected to a transmission device to which the connection code has been inputted, and, when utilization by all transmission devices that are connected to said display device have been terminated, causes the connection code creator to create a new connection code and causes the display unit to display the new connection code.

An exemplary aspect of a communication connection method according to the present invention includes the steps of: creating a connection code; creating a security key from the connection code, the security key being used to connect with a transmission device that transmits image data; and transmitting the connection code to a display device.

Otherwise, an exemplary aspect of a communication connection method according to the present invention includes: a creating step of creating a connection code; a step of displaying the connection code; a connecting step of being connected to a transmission device to which the connection code has been inputted; and, an updating step of, in a case where utilization by all connected transmission devices have been terminated, displaying a new connection code.

EXEMPLARY EMBODIMENT

Next, the present invention will be described with reference to the attached drawings.

Figure 1:
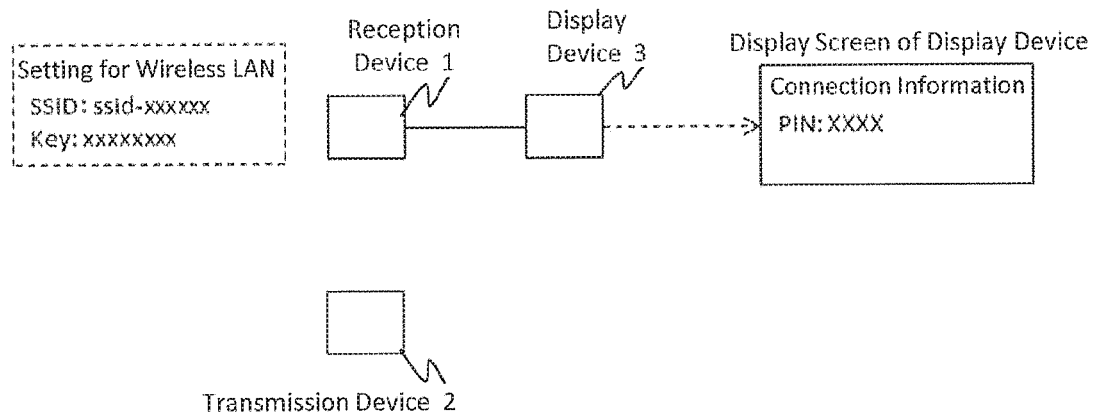
FIG. 1 is a block diagram showing a configuration example of a display system according to the present invention.

FIG. 1 is a block diagram showing a configuration example of a display system according to the present invention.

As shown in FIG. 1, the display system according to the present invention includes: reception device 1 with a function as a wireless LAN access point; transmission device 2 connected to reception device 1 via a wireless LAN; and display device 3 displaying images indicated by image data transmitted from transmission device 2 via reception device 1. In FIG. 1, a configuration example including reception device 1 and display device 3 separately is shown; however, display device 3 may be equipped with the functions of reception device 1.

Reception device 1 includes a communication function for transmitting and receiving data to and from transmission device 2 and display device 3. As described above, reception device 1 and transmission device 2 are connected by the wireless LAN. Reception device 1 and display device 3 may be connected by a known communication method by wire or wirelessly.

Transmission device 2 is a terminal device including a communication function for transmitting and receiving data by a wireless LAN, such as a personal computer, a tablet terminal or a smartphone, owned by a user. Display device 3 is, for example, a projector or a large-sized display that displays images indicated by image data transmitted from transmission device 2 via reception device 1.

On each of reception device 1 and transmission device 2, a common exclusive program (application program) has been installed in advance; by performing processing in accordance with the exclusive program in each device, connection from transmission device 2 to reception device 1 by the wireless LAN is enabled. In the present invention, a connection code is randomly created in reception device 1 and the connection code is displayed by display device 3. Moreover, in reception device 1, a security key for connecting transmission device 2 to reception device 1 via the wireless LAN is created from the connection code.

As the connection code, for example, a four-digit integer is used. It is unnecessary to limit the connection code to the four-digit integer, and a code including the other digit number, alphabets, signs or the like may be used. However, as will be described later, since the connection code is used as a so-called temporary passcode, a small digit number becomes a factor causing unauthorized access, whereas a large digit number or a complex code becomes a factor causing incorrect inputs by users.

When transmission device 2 is connected to reception device 1, a user turns on the wireless LAN function of transmission device 2 to search for an accessible (connectable) wireless LAN access point (reception device 1). When there are some accessible (connectable) wireless LAN access points (reception devices 1), transmission device 2 displays SSIDs (service set identifiers) thereof. The user selects reception device 1 to be connected from a list of the wireless LAN access points (reception devices 1) searched for by transmission device 2, and inputs the above-described connection code displayed on display device 3 into transmission device 2 in accordance with screen instructions on transmission device 2 based on the above-described exclusive program. Note that, even though reception device 1 to be connected by the SSID is not selected, transmission device 2 may select reception device 1 to be connected based on the inputted connection code.

When the connection code is inputted by the user, transmission device 2 creates a security key used for connecting to reception device 1 from the connection code. As described above, in the present invention, reception device 1 and transmission device 2 perform processing in accordance with the common exclusive program, and therefore, the security key created in reception device 1 and the security key created in transmission device 2 coincide with each other. Transmission device 2 transmits the created security key to reception device 1 selected by the user. Reception device 1 is wirelessly communicatively connected to transmission device 2 when the security key received from transmission device 2 coincides with the security key created by reception device 1 itself.

Note that reception device 1 and transmission device 2 may be connected without using the security key. For example, when transmission device 2 transmits the inputted connection code to reception device 1 and the connection code created by reception device 1 itself and the connection code received from transmission device 2 coincide with each other, reception device 1 may be wirelessly communicatively connected to transmission device 2.

Moreover, reception device 1 of the present invention monitors whether or not transmission devices 2 that are connected utilize reception device 1, and when it is determined that all the connected transmission devices 2 do not utilize reception device 1, creates a new connection code again to update the security key. This allows reception device 1 to disconnect all transmission devices 2 that were connected before re-creating the connection code. Therefore, it becomes possible for reception device 1 to newly accept connection by transmission devices 2 up to the connection upper limit number.

Note that, "connection" in this specification indicates "connection" to the wireless LAN access point (reception device 1), which refers to a state in which transmission device 2 is connected to reception device 1 via the wireless LAN and transmission device 2 is assigned an IP address to enable communication with reception device 1. Moreover, "utilization" in this specification means that transmission device 2 uses the functions of reception device 1, which refers to, for example, a user who transmits image data included in transmission device 2 to reception device 1 and causes reception device 1 to output the image data to display device 3. Here, transmission of image data from transmission device 2 to reception device 1 means "start of utilization", and stop of image data transmission means "termination of utilization". However, "termination of utilization" refers to a complete stop of image data transmission from transmission device 2, not to a temporary stop of image data transmission.

When reception device 1 includes a function capable of distributing image data transmitted from arbitrary transmission device 2 to other transmission devices 2 in a state in which they are connected to plural transmission devices 2, while distributing the image data to each transmission device 2 to display the image data, there is a state of "utilizing" the function of reception device 1. The same is true for a state in which, not only the image data, but also files or other kinds of data are distributed from reception device 1 to each transmission device 2.

Figure 2:
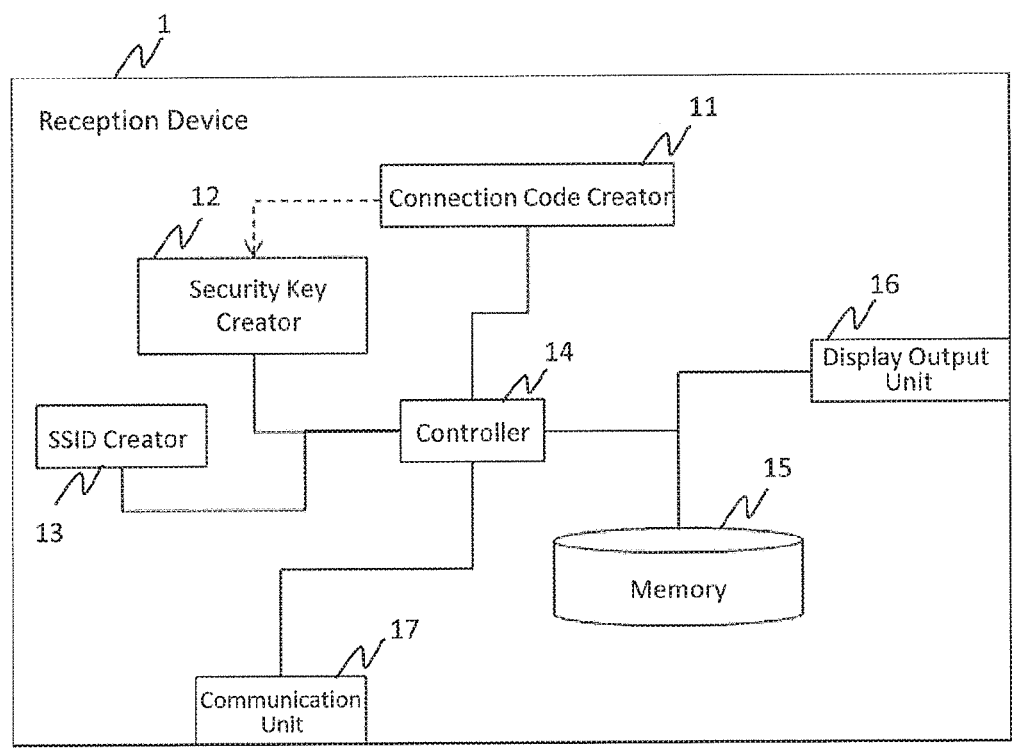
FIG. 2 is a block diagram showing a configuration example of a reception device shown in FIG. 1.
Figure 3A:
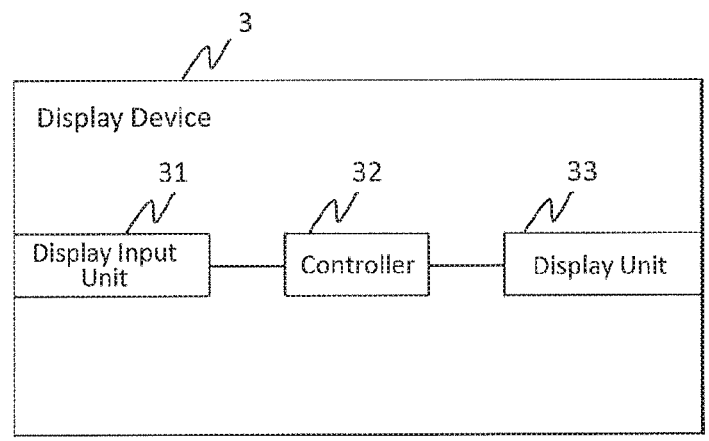
FIG. 3A is a block diagram showing a configuration example of a display device shown in FIG. 1.
Figure 4:
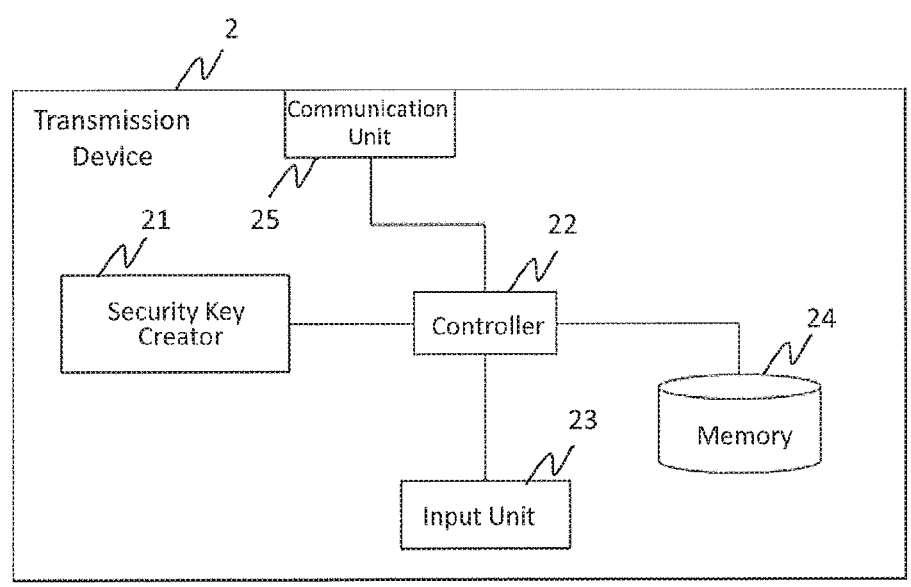
FIG. 4 is a block diagram showing a configuration example of a transmission device shown in FIG. 1.

FIG. 2 is a block diagram showing a configuration example of the reception device shown in FIG. 1, and FIG. 3A is a block diagram showing a configuration example of the display device shown in FIG. 1. FIG. 4 is a block diagram showing a configuration example of the transmission device shown in FIG. 1.

As shown in FIG. 2, reception device 1 includes: connection code creator 11; security key creator 12; SSID creator 13; controller 14; memory 15; display output unit 16; and communication unit 17.

Connection code creator 11 creates the connection code according to instructions from controller 14. The created connection code is supplied to security key creator 12 and is also converted into image data by controller 14 to be outputted to display output unit 16.

Security key creator 12 creates the security key based on the connection code created in connection code creator 11. The security key is created, by using security key creator 12, by processing of controller 14 based on the above-described exclusive program and according to a predetermined rule.

SSID creator 13 creates the SSID for identifying reception device 1. As the SSID, a device name or a preset character string may be used, and the SSID may be changed by an administrator or the like of reception device 1.

Memory 15 stores the above-described exclusive program, and also retains the connection code created in connection code creator 11, the security key created in security key creator 12, the SSID created in SSID creator 13, information about currently-connected transmission devices 2, and others.

Display output unit 16 is a communication device for transmitting and receiving information to and from display device 3, and outputs image data indicating the connection code created in connection code creator 11 to display device 3, the image data being transferred from controller 14. Display output unit 16 outputs image data, which has been transmitted from transmission device 2 and which has been received by communication unit 17, to display device 3.

Communication unit 17 is a communication device for connecting to transmission device 2 via the wireless LAN. The SSID created in SSID creator 13 and the security key created in security key creator 12 are used as network information for utilizing reception device 1 (communication unit 17) as the wireless LAN access point.

Controller 14 controls operations of reception device 1 including: connection code creator 11; security key creator 12; SSID creator 13; memory 15; display output unit 16; and communication unit 17 as a whole. Controller 14 includes a CPU (central processing unit), and, by performing processing by the CPU in accordance with the exclusive program stored in memory 15, achieves the functions of reception device 1 of the present invention.

Display device 3 shown in FIG. 3A includes: display input unit 31; controller 32; and display unit 33.

Display input unit 31 receives image data indicating the connection code outputted display output unit 16 of reception device 1 and image data outputted from reception device 1, which has been transmitted from transmission device 2.

Display unit 33 displays an image indicated by image data received at display input unit 31.

Controller 32 performs processing for causing display unit 33 to display the image indicated by the image data received at display input unit 31. Controller 32 includes a CPU, and, by performing processing by the CPU in accordance with a program stored in a not-shown memory device, achieves the functions of display device 3.

Figure 3B:
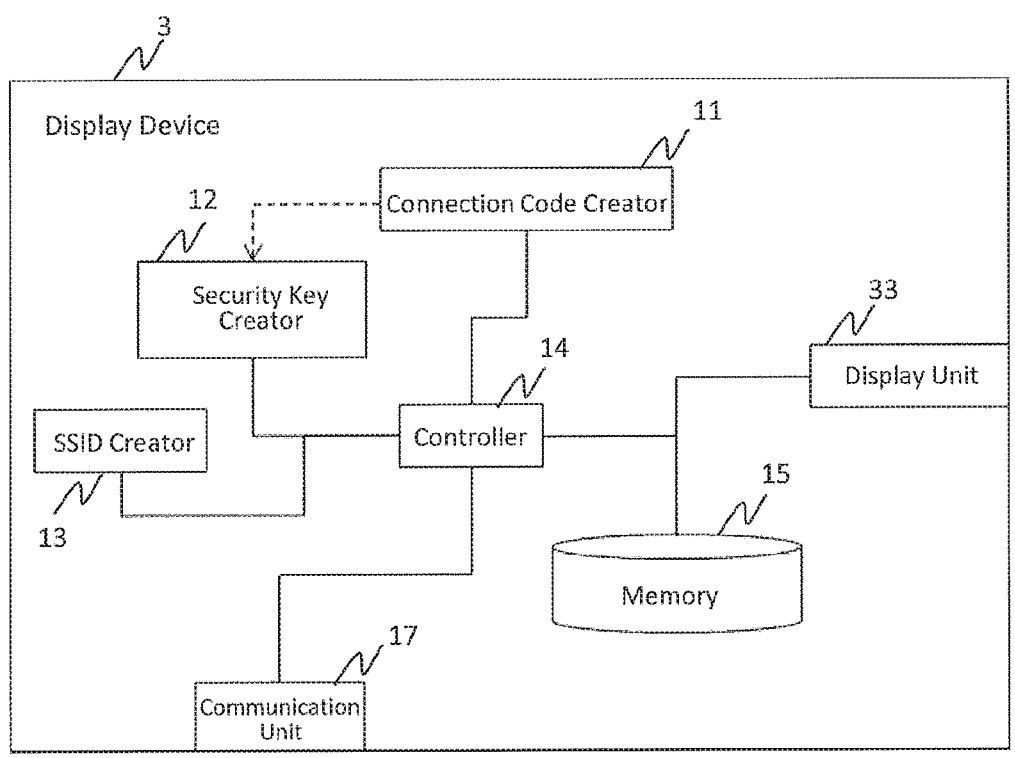
FIG. 3B is a block diagram showing another configuration example of the display device.

As described above, display device 3 may include a configuration with reception device 1 shown in FIG. 2. A configuration example of such display device 3 is shown in FIG. 3B. FIG. 3B is a block diagram showing another configuration example of the display device.

Display device 3 shown in FIG. 3B includes: connection code creator 11; security key creator 12; SSID creator 13; controller 14; memory 15; display unit 33; and communication unit 17.

Display device 3 shown in FIG. 3B includes a configuration in which controller 14 includes the functions of controller 14 provided to reception device 1 shown in FIG. 2 and controller 32 provided to display device 3 shown in FIG. 3A, and display output unit 16 provided to reception device 1 shown in FIG. 2 and display input unit 31 provided to display device 3 shown in FIG. 3A are omitted.

Connection code creator 11, security key creator 12, SSID creator 13, controller 14, memory 15 and communication unit 17 shown in FIG. 3B include configurations similar to those of connection code creator 11, security key creator 12, SSID creator 13, controller 14, memory 15 and communication unit 17 provided to reception device 1 shown in FIG. 2, and display unit 33 includes a configuration that is the same as display unit 33 provided to display device 3 shown in FIG. 3A; therefore, description thereof will be omitted here.

As shown in FIG. 4, transmission device 2 includes: security key creator 21; controller 22; input unit 23; memory 24; and communication unit 25.

Input unit 23 is an input device for allowing a user to input various kinds of instructions, information or the like to transmission device 2. The connection code displayed on display device 3 is inputted to transmission device 2 by the user by using input unit 23.

Security key creator 21 creates the security key from the connection code inputted by the user by using input unit 23. The security key is created, by using security key creator 21 and by processing performed by controller 22 based on the above-described exclusive program according to a predetermined rule.

Memory 24 stores the above-described exclusive program, and also stores user data including security key created by security key creator 21 and the image data displayed on display device 3.

Communication unit 25 is a communication device for connecting to reception device 1 via the wireless LAN.

Controller 22 controls operations of transmission device 2 including: input unit 23; security key creator 21; memory 24; and communication unit 25 as a whole. Controller 22 includes a CPU and, by performing processing that is executed by the CPU in accordance with the exclusive program stored in memory 24, achieves the functions of transmission device 2 of the present invention.

Next, operations of the reception device and the transmission device of the present invention will be described by using drawings.

Figure 5:
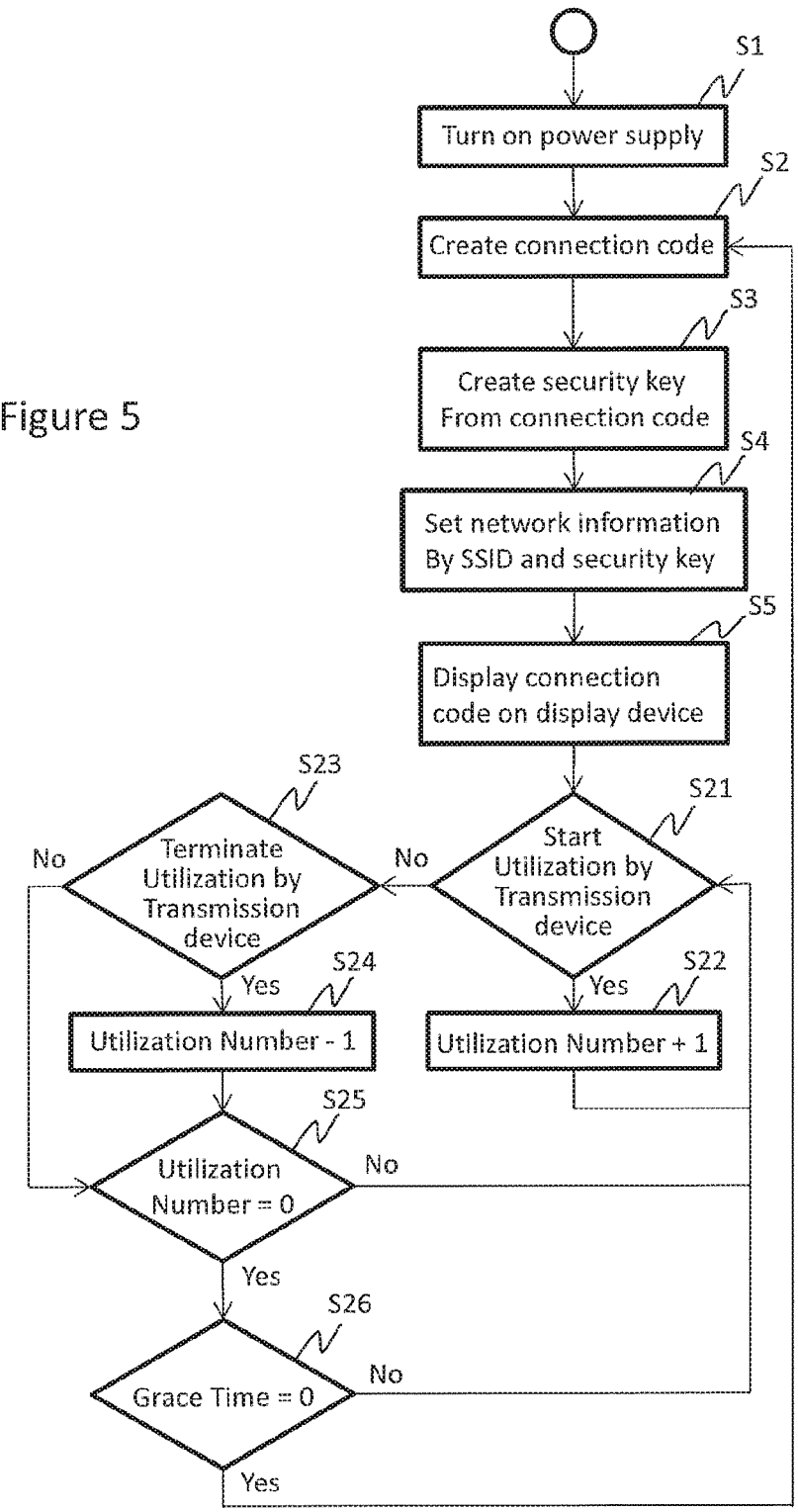
FIG. 5 is a flowchart showing an example of processing performed by the reception device shown in FIG. 1.
Figure 6:
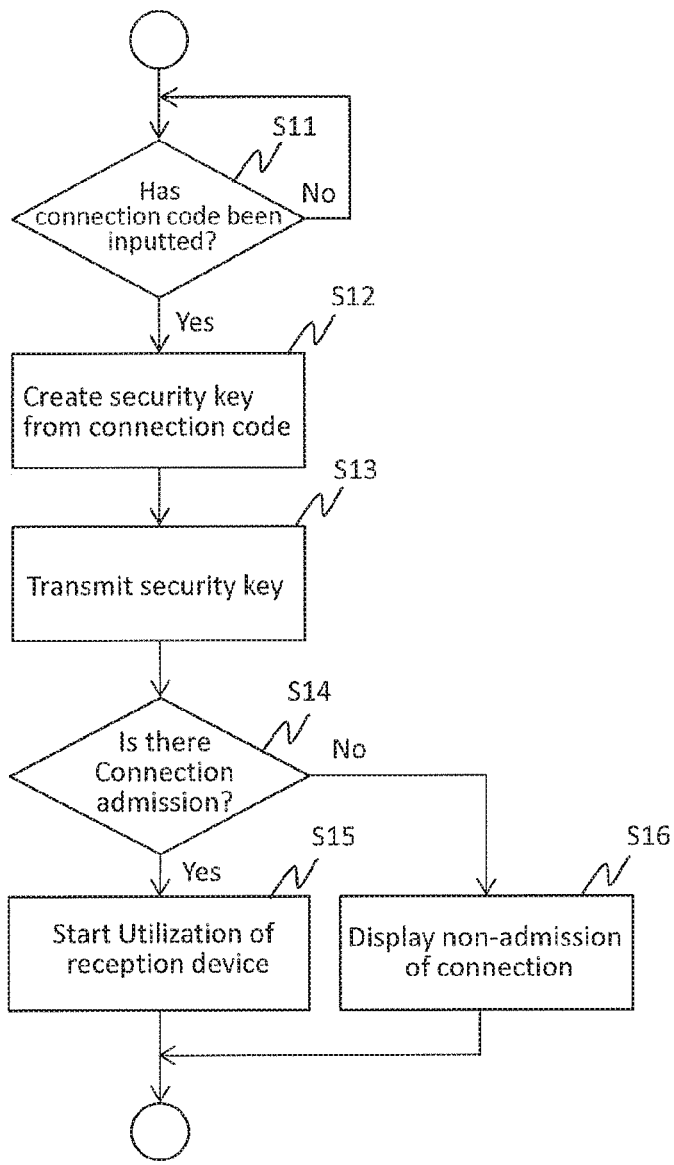
FIG. 6 is a flowchart showing an example of processing performed by the transmission device shown in FIG. 1.

FIG. 5 is a flowchart showing an example of processing performed by the reception device shown in FIG. 1, and FIG. 6 is a flowchart showing an example of processing performed by the transmission device shown in FIG. 1.

Note that the processing performed by reception device 1 and transmission device 2 described below is assumed to be performed by controllers 14 and 22 provided to respective devices.

As shown in FIG. 5, when a power supply is turned on by a user or the like (step S1), first, reception device 1 creates a connection code by using connection code creator 11 (step S2), and then creates a security key from the connection code by using security key creator 12 (step S3).

Next, reception device 1 sets an SSID created in SSID creator 13 and the security key created in security key creator 12 as network information for connecting transmission device 2 to reception device 1 (step S4), and stores them in memory 15.

Subsequently, reception device 1 transmits image data indicating the connection code created in connection code creator 11 to display device 3, and causes display device 3 to display the connection code (step S5). From then on, reception device 1 waits to be connected by transmission device 2.

As shown in FIG. 6, when the user starts an exclusive program provided to transmission device 2, transmission device 2 determines whether or not the connection code has been inputted by the user (step S11). When the connection code has not been inputted, processing in step S11 is repeated, and the input of the connection code by the user is waited.

When reception device 1 to be connected is selected by the user and the connection code displayed on display device 3 is inputted, transmission device 2 creates a security key, from the connection code by using security key creator 21, for connecting to reception device 1 selected by the user (step S12).

Next, transmission device 2 transmits the created security key to reception device 1 selected by the user (step S13). Reception device 1 compares the security key received from transmission device 2 with the security key created by reception device 1 itself; when the security keys coincide with each other, reception device 1 transmits a signal indicating connection admission to transmission device 2 and is wirelessly communicatively connected to transmission device 2. When the security key received from transmission device 2 and the security key created by reception device 1 itself do not coincide with each other, reception device 1 is not connected to transmission device 2.

After transmitting the security key, transmission device 2 determines whether or not the signal indicating connection admission has been transmitted from reception device 1 until a predetermined time has elapsed (step S14). When the signal indicating connection admission has been received, transmission device 2 starts utilization of reception device 1 (step S15). When the signal indicating connection admission has not been transmitted from reception device 1, for example, transmission device 2 displays non-admission of connection (step S16) to provide notification to the user, and waits for instructions inputted by the user.

When utilization of reception device 1 is started, by transmitting image data to display device 3 via reception device 1, transmission device 2 can cause display device 3 to display an image indicated by the image data. Moreover, the user can terminate utilization of reception device 1 by transmission device 2 at an arbitrary timing by changing the settings of transmission device 2. However, though the user terminates utilization of reception device 1, connection between transmission device 2 and reception device 1 via the wireless LAN is not disconnected.

As shown in FIG. 5, reception device 1 determines whether or not new transmission device 2 is connected and utilization of reception device 1 by transmission device 2 is started (step S21), and when utilization of reception device 1 by transmission device 2 is started, the number of utilization is incremented by one (step S22). Moreover, when utilization of reception device 1 by new transmission device 2 is not started, reception device 1 determines whether or not utilization of reception device 1 by transmission device 2 that is being connected has been terminated (step S23). When utilization of reception device 1 by transmission device 2 has been terminated, reception device 1 decrements the number of utilization by one (step S24).

Whether or not transmission device 2 utilizes reception device 1 may be determined by reception device 1 side. For example, reception device 1 causes each transmission device 2 that is being connected to transmit a signal indicating an operating state in a predetermined cycle, and transmission device 2 that does not transmit the signal may be determined to have terminated utilization of reception device 1. The determination method about whether or not transmission device 2 utilizes reception device 1 is not limited to the above-described method, and any method may be used as long as it is possible to determine whether or not transmission device 2 that is being connected utilizes reception device 1.

When it is determined, in step S23, that utilization of reception device 1 by transmission device 2 has not been terminated, or when the number of times that reception device 1 has been used is decremented by one in step S24, reception device 1 determines whether or not the number of times that reception device 1 has been used is 0, that is, whether or not utilization by all transmission devices 2 has been terminated (step S25). When utilization by all transmission devices 2 has not been terminated, returning to the processing in step S21, and processing in step S21 and the steps subsequent thereto is repeated.

Moreover, when it is determined that utilization by all transmission devices 2 has been terminated, reception device 1 determines whether or not a predetermined grace time has elapsed (step S26), and, when the grace time has not elapsed, returning to the processing in step S21, and processing in step S21 and the steps subsequent thereto are repeated. Moreover, when the grace time has elapsed, reception device 1 returns to the processing in step S2 to re-create the connection code, and updates the security key (step S3) to repeat subsequent processing.

According to the present invention, by only inputting, by a user, a connection code displayed on display device 3 to transmission device 2, transmission device 2 is connected to reception device 1, and thereby it becomes possible for the user to utilize reception device 1. Consequently, connection to a device including the wireless LAN access point (reception device 1) is easily available.

Moreover, in reception device 1, when it is determined that utilization by all transmission devices 2 has been terminated, a new connection code is re-created to update the security key. In this case, since all transmission devices 2 that have been connected before re-creation of the connection code are disconnected, it becomes possible for reception device 1 to newly accept connection by transmission devices 2 up to the connection upper limit number. Therefore, the problem in which the number of connectable transmission devices 2 to be connected from then on is reduced because the state in which previously-connected transmission devices 2 has been maintained, which arises from the connection upper limit number of the wireless LAN access point (reception device 1), can be solved.

Further, though it is determined that utilization by all users has been terminated, reception device 1 does not re-create the connection code until the predetermined grace time has elapsed; accordingly, for example, even if transmission device 2 is unintentionally and temporarily disconnected from reception device 1, no determination is made that utilization has been terminated, and the connecting state is maintained. Therefore, when transmission device 2 is to utilize reception device 1 again, it becomes possible to utilize it at once. The grace time can be arbitrarily set.

The present invention has been described above with reference to the exemplary embodiment; however, the present invention is not limited to the above-described exemplary embodiment. Configurations or details of the present invention can be subjected to various modifications understandable by those skilled in the art within the scope of the present invention.

The invention claimed is:

1. A display system comprising:
   a transmission device that transmits image data;
   a reception device that is connected to said transmission device and receives the image data; and
   a display device that displays an image indicated by the image data received by said reception device, wherein:
   said reception device creates a connection code, and creates a security key from the connection code, the security key being used to connect with said transmission device,
   said display device displays the connection code;
   said transmission device creates the security key from the connection code having been inputted, and is connected to said reception device by using the security key;
   when utilization by all transmission devices that are connected to said reception device has been terminated, said reception device creates a new connection code to update the security key and causes the display device to display the new connection code after disconnecting the all transmission devices;
   the state where the image is displayed by said display device is astate where said reception device is used by said transmission device; and
   the state where the utilization of said reception device has been terminated by said transmission device is a state where transmission of the image data from the all connected transmission devices are stopped and where the image is not displayed by said display device.

2. The display system according to claim 1, wherein, when utilization by the all transmission devices that are connected to said reception device have been terminated, after a predetermined grace time has elapsed, said reception device creates a new connection code to update the security key.

3. A reception device comprising:
   a communication unit that is connected to a transmission device transmitting image data and that receives the image data;
   a connection code creator that creates a connection code;
   a security key creator that creates a security key from the connection code, the security key being used to connect with the transmission device; and
   a display output unit that outputs the connection code, wherein:
   when utilization by all connected transmission devices has been terminated, said connection code creator creates a new connection code, said display output unit outputs the new connection code created by said connection code creator to a display device and causes the display device to display the new connection code, said security key creator updates the security key from the new connection code created by said connection code creator, after the all transmission devices are disconnected;
   the state of displaying image indicated by image data is a state where said reception device is used by said transmission device; and
   the state where the utilization of said reception device has been terminated by said transmission device is a state where transmission of the image data from the all connected transmission devices are stopped and where the image is not displayed by said display device.

4. The display system according to claim 1, wherein, in the utilization, the transmission device uses functions of the reception device including transmitting the image data included in transmission device to the reception device and causing the reception device to output the image data to the display device.

5. The display system according to claim 1, wherein a start of the utilization includes transmission of the image data from the transmission device to the reception device.

6. The display system according to claim 1, wherein the termination of the utilization of said reception device includes a complete stop of the image data transmission from the transmission device.

7. The reception device according to claim 3, wherein, in the utilization, the transmission device uses functions of the reception device including transmitting the image data included in transmission device to the reception device and causing the reception device to output the image data to the display output unit.

8. The reception device according to claim 3, wherein a start of the utilization includes transmission of the image data from the transmission device to the reception device.

9. The reception device according to claim 3, wherein the termination of the utilization of said reception device includes a complete stop of the image data transmission from the transmission device.

10. A communication connection method comprising:
    creating a connection code;
    displaying the connection code;
    connecting to a transmission device to which the connection code has been inputted;
    receiving image data transmitted from the transmission device; and
    updating comprising, in a case where utilization by all connected transmission devices has been terminated, creating and displaying a new connection code, after disconnecting the all transmission devices, wherein:
    the state of displaying image indicated by image data is a state of being used by said transmission device; and
    the state where the utilization has been terminated by said transmission device is a state where transmission of the image data from the all connected transmission devices is stopped and where the image is not displayed.

11. The communication connection method according to claim 10, wherein, in said connecting, in a case where a security key created from the connection code having been inputted to the transmission device coincides with a security key created from the connection code in said creating, connection to the transmission device is made.

12. The communication connection method according to claim 10, wherein the utilization includes transmitting the image data included in the transmission device to a reception device and causing the reception device to output the image data for displaying the connection code.

13. The communication connection method according to claim 12, wherein a start of the utilization includes transmission of the image data from the transmission device to the reception device.

14. The communication connection method according to claim 12, wherein the termination of the utilization of said reception device includes a complete stop of the image data transmission from the transmission device.

* * * * *